DUAL SPLINDED SHAFT ASSEMBLY FOR A CLUTCH

Original Filed May 31, 1967

INVENTOR

WAYNE P. GINGERY

BY Sherman Levy ATTORNEY

United States Patent Office

Re. 27,126
Reissued May 25, 1971

27,126

DUAL SPLINED SHAFT ASSEMBLY FOR A CLUTCH

Wayne P. Gingery, Harlan, Iowa, assignor to Super-Drive Products, Inc., Los Angeles, Calif.

Original No. 3,465,860, dated Sept. 9, 1969, Ser. No. 642,363, May 31, 1967. Application for reissue May 8, 1970, Ser. No. 35,835
Int. Cl. F16d *13/44, 13/58*
U.S. Cl. 192—70.13 8 Claims

Matter enclosed in heavy brackets [ ] appears in the original patent but forms no part of this reissue specification; matter printed in italics indicates the additions made by reissue.

ABSTRACT OF THE DISCLOSURE

A dual splined sleeve which will protect the original shaft from damage due to high engine torque, and wherein greater lateral resistance is provided. *When the splines of the shaft become worn at their central portions, the dual splined sleeve is fitted over them so as to engage the shaft splines and extend beyond the worn portion. At least one disc member is provided with an internally splined hub and friction facing means on its outer portions, and the splined hub is fitted over the external splines of the sleeve so as to position the friction facing means for engagement by the clutch-actuating mechanism.*

BACKGROUND OF THE INVENTION

The present invention pertains to class 64, subclasses 1, 9 and 23; class 287, subclass 53; class 74, subclasses 595 and 640; class 192, subclasses 20 and 30.

DESCRIPTION OF THE PRIOR ART

The prior art includes the following prior patents: 1,149,881; 1,912,412; 2,072,090; 2,415,893; 2,515,366; 2,772,547; 2,773,369; 2,952,999; 2,993,579; 2,698,013; 3,020,775; 3,024,626; 3,120,570; 3,210,136; 3,263,450; 3,273,415; and 3,293,884.

Some of the differences or advantages that the present invention has over those prior patents is as follows:

By means of the present invention, the transmission front drive shaft can withstand the additional forces for increased periods of time and, in addition, failure of the driven plates which attach to the friction discs of the clutch proper will be eliminated. Also, with the present invention the original shaft will be protected from damage due to high engine torque, and the dual splined sleeve of the present invention will have the advantage of greater lateral resistance to impact. Furthermore, the dual splined sleeves are expendable, and hence will eliminate the need of replacing expensive parts and the attendant labor cost. Also, in addition the dual splined sleeve can be installed at any time in the life of the equipment without the necessity of shaft replacement.

SUMMARY OF THE INVENTION

In accordance with the present invention there is provided a clutch superdrive which will permit the transmission front drive shaft to withstand increased forces and, in addition, the present invention will help eliminate the premature failure of parts such as the driven plates which attach to the friction discs of the clutch proper. The present invention is rearily adaptable to any of the well-known domestic or other transmissions which use a plate clutch.

DESCRIPTION OF THE PREFERRED EMBODIMENT

Figure 1:
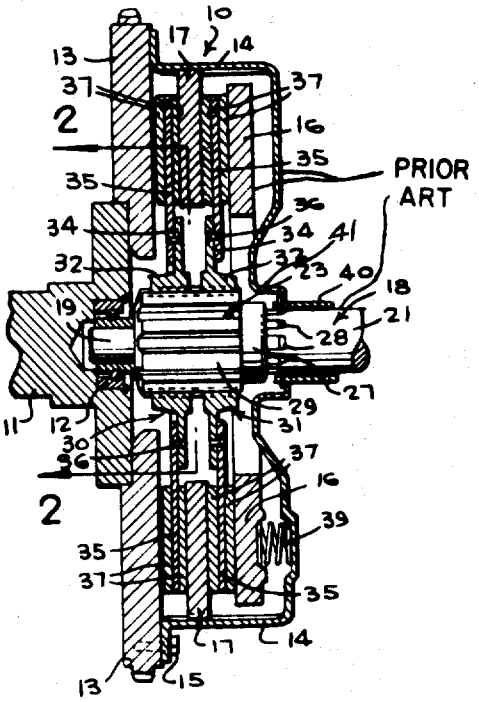
FIG. 1 is a cross-sectional view of a clutch, constructed according to the present invention.

Referring in detail to the drawings, the numeral 10 indicates a clutch assembly which is adapted to be used in a suitable location such as in conjunction with a transmission of a truck engine or the like, and as shown in FIG. 1, the numeral 11 indicates an input shaft element which has a pilot bearing 12 contiguous thereto, and the numeral 13 indicates a flywheel which is arranged adjacent the shaft element 11. The numeral 14 indicates a retainer *housing* which may be affixed to the flywheel 13 in any suitable manner, as for example by means of securing elements 15. There is further provided a pressure plate 16 which is spaced from the flywheel 13, and a conventional center plate 17 is interposed between the pressure plate 16 and the flywheel 13. The numeral 18 indicates a shaft member which has a reduced diameter, smooth end portion 19 which is contiguous to the pilot bearing 12, and the shaft member further includes an intermediate splined portion 20, as well as a smooth section or portion 21, and a gear 22 on the end of the shaft member 18 is adapted to be used for actuating the transmission in the usual manner.

Figure 2:
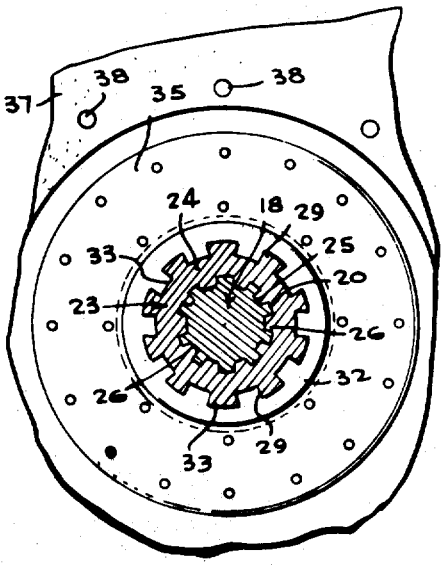
FIG. 2 is a sectional view taken on the line 2—2 of FIG. 1.
Figure 3:
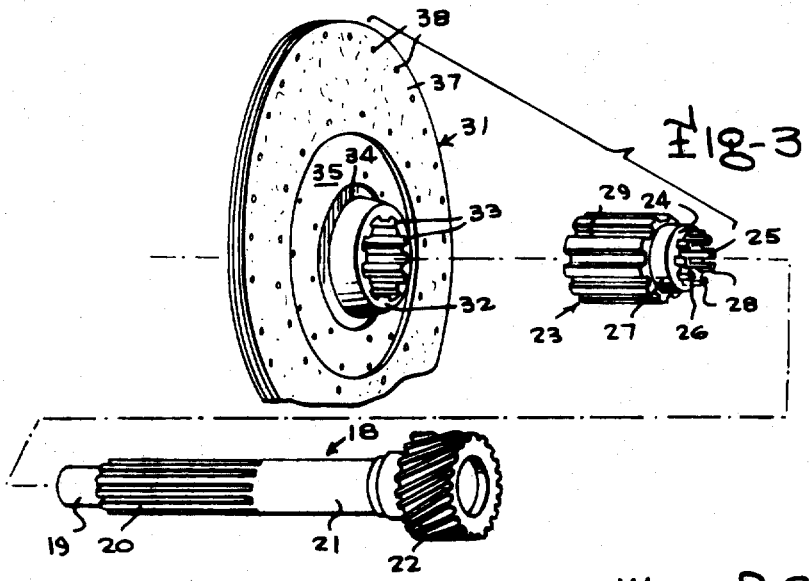
FIG. 3 is an exploded perspective view of certain constructional details of the present invention.

In accordance with the present invention, there is provided a dual splined sleeve 23 which includes a main body portion 24 that has a hollow interior 25 for the projection therethrough of the shaft member 18. The sleeve 23 has inwardly disposed spaced parallel longitudinally extending splines 26 which interfit and interengage with the splines 20 of shaft member 18, as shown in FIG. 2 for example.

The sleeve 23 further includes a smooth portion 27 and the inner splines 26 project or extend outwardly beyond the smooth portion 27 as indicated by the numeral 28. The sleeve 23 is further provided on its outer surface with spaced parallel longitudinally extending splines or ribs 29 for a purpose to be later described.

There is further provided a pair of spaced parallel clutch driven members 30 and 31 which each have a centrally disposed hub 32 that is provided with inwardly directed splines 33 for coaction and engagement with the outer splines 29 of the sleeve 23. The clutch driven members 30 and 31 further each include circular flange sections 34 which have carrier discs 35 affixed thereto as at 36, and facings 37 are adapted to be secured to the carrier disc 35 as by means of rivets 38.

From the foregoing, it will be seen that there has been provided a clutch superdrive, and in use with the parts arranged as shown in the drawings it will be noted that in accordance with the present invention there is provided the dual splined sleeve 23 and the associated parts. Thus, the sleeve 23 has the splines 26 which mesh and engage with the splines 20 on the shaft member 18. Also, the sleeve 23 has the outer splines 29 which mesh with and are engaged by the splines 33 of the pair of clutch driven members 30 and 31. In the drawings in FIG. [3] *1* the numeral 39 indicates spring members which are adapted to engage the pressure plate 16.

By way of background of the present invention the following is submitted:

Recently in the last few years the truck engine industry has gradually increased the H.P. ratings of their diesel equipment up to a point where the tremendous increase in engine torque has caused the balance of the gear train to be subjected to stresses for which it was not originally designed. In one area in particular, namely, the transmission front drive shaft has not been able to withstand the new added forces for any appreciable length of time.

In addition, a second or further point of premature failure are the driven plates which attach to the friction discs of the clutch proper. With the present invention, these deficiences or shortcomings are ovecome, and these may be considerably expensive in terms of initial cost and protection of the original of the factory assembly or equipment.

With further reference to the drawings, the dual splined sleeve 23 has its inner diameter machined to the size and tolerances of the original drive shaft such as the shaft 18. The splined end of this shaft is approximately 4" long. However, only the approximate middle one-third of the length of the spline 20 gradually deforms in a radial manner as a result of the tremendous force exerted when the clutch is engaged. The end result of this continuous impact ultimately causes deformation to the extent that the driven plates will not move on the shaft when released by the pressure plate 16, but rather will hang up in the deformations and as a result the clutch remains firmly locked in an engaged status or location. The dual splined sleeve 23 of the present invention will overcome this defect or shortcoming in the following ways or manner:

First, it will protect the original shaft 18 from damage due to high engine torque, possibly as long as the transmission remains in service, and this is because the entire length of the original splines will be engaged and not subjected to the severe pounding which heretofore took place.

Second, the dual splined sleeve 23 will have the distinct and important advantage of greater lateral resistance to impact because of the increased diameter and resulting weight of metal between each spline and thus longer life will be assured.

Third, the dual spline sleeves 23 are expendable, and hence they will preclude the necessity of replacing a very expensive part as well as eliminating an extremely high labor cost especially on the highway when disassembly and reassembly of the transmission would not be necessary because the drive shaft would not have to be replaced.

Fourth, the dual splined sleeves 23 will have the unique feature or advantage that they can be installed at any time within the life of the equipment without the down time for shaft replacement or the like.

In the drawings there is illustrated a companion device made necessary by the increase in diameter of the dual splined sleeve 23. The driven plates or members 30 and 31 are the second most troublesome spots in clutch assemblies due to the shear in the rivets which connect the plates to the friction discs. In the driven plates of the present invention the number of rivets has been increased and the distance between rivets has also been increased and this assures that greater shear values are attained. It is to be noted that the hub diameter has been increased to accommodate the dual splined drive.

Further, these previous two components are not designed to be accessories for any particular existing manufacturer's equipment and, in fact, they are readily adaptable to any of the well-known domestic transmissions using a two-plate clutch.

In the present invention the parts are arranged or constructed so as to insure long life or quiet movement between the parts, and the parts are engineered to work together in the desired manner to provide or assure durable trouble-free use.

The parts can be made of any suitable material and in different shapes or sizes.

The pressure plate 16 is part of the existing clutch, and the flywheel 13 is likewise a conventional part of a two-plate clutch assembly. Four friction facings 37 are provided. As shown in the drawings, there is provided the clutch driven member 30 for the flywheel side, and there is also the clutch driven member 31 for the pressure plate side. There is also two facing carriers 35 which are in the form of flat metal discs that are fastened to the hub and hold the friction facings. The numeral 17 indicates the existing center plate. The clutch sleeve retainer 14 and part 40 are parts of the existing clutch assembly. The splined sleeve 23 is machined to fit inside the clutch sleeve retainer and allow it to move as the clutch wears. The splined sleeve 23 is machined to permit free movement of the clutch sleeve part 40 and prevent the splined sleeve 23 from moving backwards. *The retainer housing 14 includes an inner tubular portion 41 that receives and provides clearance around the smooth unsplined portion 27 of the sleeve 23.* There is a chamfer to protect the existing pilot bearing 12, and this is part of the flywheel 13. The spline in the inside of the chamfer contact inside the bearing serves to keep the sleeve from moving forward. Parts such as the parts 28 and opposite end portion of the splined sleeve serve to hold the splined sleeve on the existing input shaft so as to prevent movement thereof.

It is to be noted that with the parts arranged as shown in the drawings, normally the shaft element 11 is continuously rotating, and it is to be understood that the shaft member 18 only rotates when the clutch 10 is properly actuated or engaged. Also, with the present invention in the event that repairs have to be made, it is only necessary generally to remove and replace the spline sleeve 23 so that it is not necessary to replace the entire clutch. In addition, as previously stated, the present invention includes the previously mentioned clutch driven members which have the inner splines 33 for engaging the outer splines 29 on the sleeve 23, and, in addition, the clutch drive members 29 and 30 have the improved mounting means for the friction facings 37.

*In summary, when the central portions of the splines 20 of the shaft 18 become deformed, the dual splined sleeve 23 is fitted over the shaft so that its internal splines 26 mesh with the splines 20 beyond the worn portions, the clutch-driven members 30 and 31 are provided with outer friction facings 37 and hubs 32 with internal splines 33, and the hubs are fitted over the sleeve 23 so that the external splines 29 of the sleeve are engaged by the hub splines 33, with the friction facings 37 then being positioned for engagement by the clutch-actuating mechanism. When the sleeve 23 is fitted on the shaft 18, it is appropriately held against substantially longitudinal movement relative to the shaft, such as by the spline extensions 28 and the opposite end of the sleeve, while the hubs 32 are made to a combined length less than the external splines 29 so that the clutch-driven members 30 and 31 can move relative to the sleeve.*

It will now be clear that there is provided a device which accomplishes the objectives heretofore set forth. While the invention has been disclosed in its preferred form as described and illustrated herein it is not to be considered in a limited sense as there may be other forms or modifications of the invention which should also be construed to come within the scope of the appended claims.

What is claimed is:

1. In a clutch for a movable vehicle such as a truck, an input shaft element, a pilot bearing positioned adjacent to said input shaft element, a flywheel arranged contiguous to said shaft element, a retainer positioned contiguous to said flywheel and connected to said flywheel, a pressure plate arranged in spaced apart relation with respect to said flywheel, a center plate positioned between said flywheel and said pressure plate, a shaft member provided with a reduced diameter smooth end portion, said smooth end portion being arranged in engagement with said pilot bearing, said pilot bearing including an outer race and an inner race, the outer race being axially shorter than said inner race thereby providing an axial space between said outer race and a sleeve, said shaft member further embodying an intermediate splined portion, a smooth section positioned adjacent to said splined portion; said sleeve being a dual splined expendable sleeve embodying a main body portion having a hollow interior for the projection therethrough of said shaft member, said sleeve being provided with inwardly disposed splines engaging the splines on said shaft member throughout the entire length of the splines on the shaft member, said sleeve further including a smooth portion, the inner splines on the sleeve extending outwardly beyond the smooth portion of the sleeve, said sleeve further being provided with a plurality of spaced longitudinally extending splines on the outer surface thereof, a pair of spaced apart clutch driven members each having an inwardly splined hub arranged in engagement with the outer splines of said sleeve, said center plate being interposed between said pair of clutch driven members, said clutch driven members each having a circular flanged section having a carrier disc affixed thereto, and friction facings affixed to both sides of each of said carrier discs by rivets, said hub having sufficient diameter for receiving and accommodating therein said dual splined [shaft] *sleeve,* said sleeve serving to help prevent distortion of the shaft member and also protect the shaft member from damage due to torque.

*2. The method of providing an improved replacement clutch device for operation with a clutch-actuating mechanism and an exteriorly splined shaft connected to a vehicle transmission where said shaft has become significant distorted at a portion of the splines thereof that extends for less than the entire length of said splines, without replacement of said shaft comprising the steps of*

*providing a sleeve having first splines on the interior and second splines on the exterior thereof, such that said first splines are longer than said significantly distorted portion of said shaft,*

*fitting said sleeve over said shaft with said first splines engaging said splines of said shaft at portions of said splines of said shaft extending beyond said significantly distored portion of said splines of said shaft,*

*providing at least one disc member with a hub having an opening therethrough,*

*forming internal splines in said opening in said hub,*

*attaching friction facing means on outer portions of said disc member,*

*and fitting said hub of said disc member over said sleeve so that said splines of said hub are in engagement with said second splines, and so as to position said friction facing means where it is engageable by said clutch-actuating mechanism.*

*3. The method of providing for the operation of a clutch assembly that includes a flywheel, a pressure plate, a center plate intermediate said flywheel and said pressure plate, and an exteriorly splined transmission drive shaft inwardly of said flywheel, pressure plate and said center plate, in which said shaft has external splines significantly distorted through a portion of the length of said splines less than the entire length of said splines, and without replacing said shaft, comprising the steps of*

*providing a sleeve having first splines internally thereof and second splines on the exterior thereof, with said internal splines being longer than said significantly distorted portion of said splines of said shaft, fitting said sleeve over said shaft so that said first splines mesh with said splines on said shaft at portions of said splines on said shaft beyond said significantly distorted portion,*

*holding said sleeve on said shaft so as to limit the axial movement of said sleeve relative to said shaft,*

*providing enlarged splined openings in the hubs of a pair of disc members such that the combined lengths of said enlarged splined openings are less than the length of said second splines,*

*fitting said hubs of said disc members on said sleeve so that the splines of said splined openings mesh with said second splines,*

*attaching clutch friction facings to both sides of the outer portions of said disc members,*

*and positioning said outer portions such that one of said outer portions is between said center plate and said flywheel, and the other of said outer portions is between said pressure plate and said center plate.*

*4. The method of providing for the operation of a clutch assembly that includes a flywheel, a pressure plate, a center plate intermediate said flywheel and said pressure plate, and an exteriorly splined transmission drive shaft inwardly of said flywheel, said pressure plate and said center plate, in which said shaft has external splines significantly distorted through a portion of the length of said splines less than the entire length of said splines, and without replacing said shaft, comprising the steps of*

*providing a sleeve having first splines internally thereof and second splines on the exterior thereof, with said internal splines being longer than said significantly distorted portion of said splines of said shaft, fitting said sleeve over said shaft so that said first splines mesh with said splines on said shaft at portions of said splines on said shaft beyond said significantly distorted portion,*

*forming a pair of members so that each has a central hub portion having an opening therethrough and an outer flange extending radially from said hub portion,*

*forming internal splines in said opening in said central hub portion of each of said members, forming a pair of annular disc having*

*greater outside diameters than the outside diameters of said outer flanges,*

*and inside diameters less than the outside diameters of said outer flanges,*

*engaging the side of each of said outer flanges with the side of the inner portion of one of said annular discs,*

*attaching one of said annular discs to each of said outer flanges at the location of said engagement therebetween,*

*attaching an annular friction facing to either side of each of said annular discs outwardly of said outer flanges,*

*positioning said central hub portions on said sleeve in a spaced end-to-end relationship with said internal splines in said openings of said central hub portions meshing with said second splines of said sleeve,*

*and positioning said annular discs such that said friction facings on one of said annular discs are between said central plate and said flywheel, and said friction facings on the other of said annular discs are between said center plate and said pressure plate.*

*5. The method as recited in claim 4 in which, for attaching said friction facings to said annular discs, rivets are extended through each of said annular discs and through the friction facing on either side thereof.*

*6. In combination with the transmission drive shaft having a gear at one end thereof for engagement with the gears of a vehicle transmission, a reduced diameter portion at the other end, and external splines adjacent said reduced diameter portion, which splines are significantly distorted for a portion of the length thereof that is less than the total length of said splines, said splines having remaining portions which are undistorted, a clutch device comprising*

*a sleeve,*

*said sleeve having internal splines longer than said distorted portion of said external splines of said shaft,*

*said shaft being received in said sleeve with said internal splines of said sleeve engaging said external splines of said shaft,*

*said engagement extending beyond said significantly distorted portion of said splines on said shaft to said undistorted portions of said splines,*

*said sleeve having external splines shorter than said internal splines, and having an unsplined outer portion adjacent one end of said sleeve,*

*said unsplined portion having an outside diameter less than the outside lateral dimension of said external splines of said sleeve,*

*a duality of clutch-driven members,*

*each of said members including a first element having*

*a hub having an opening therethrough,*

*and an outer radial flange extending from said hub, each of said hubs having internal splines in said opening thereof meshing with said external splines of said sleeve, with said hubs being in an end-to-end relationship on said sleeve,*

*each of said members having an annular disc having an inner portion overlapping said outer flange of said first element,*

*and an outer portion radially outwardly of said outer flange,*

*each of said members including means attaching said inner portion of said annular disc thereof to said outer flange overlapped thereby,*

*each of said clutch driven members including a duality of annular friction facings,*

*said facings engaging said outer portion of said annular disc and being disposed one on either side of said annular disc,*

*and means attaching said friction facings to said annular discs,*

*a flywheel means,*

*a bearing carried by said flywheel means and receiving said reduced diameter portion of said shaft,*

*a center plate,*

*a pressure plate,*

*said flywheel means, center plate and pressure plate being in spaced alignment,*

*said outer portion of said annular disc and said friction facings of one of said members being between said flywheel means and said center plate,*

*and said outer portion of said annular disc and said friction facings of the other of said members being between said center plate and said pressure plate,*

*and a retainer housing around said center plate and pressure plate,*

*one end of said retainer housing being attached to said flywheel means,*

*said retainer housing having an opposite end wall having an inner tubular portion around said shaft in spaced adjacency therewith,*

*said unsplined portion of said sleeve extending into said inner tubular portion and being in a spaced relationship with said inner tubular portion.*

*7. A device as recited in claim 6 in which said means for attaching said friction facings to said discs includes rivets extending through said discs and said friction facings.*

*8. A device as recited in claim 6 including in addition means for limiting the axial movement of said sleeve on said shaft.*

References Cited

The following references, cited by the Examiner, are of record in the patented file of this patent or the original patent.

UNITED STATES PATENTS

| | | | |
|---|---|---|---|
| Re. 19,876 | 3/1936 | Criley | 192—70.2(X) |
| 1,732,965 | 10/1929 | Carhart | 192—70.2 |
| 1,903,963 | 4/1933 | Emrick | 192—70.2 |
| 1,969,149 | 8/1934 | Pearmain | 192—70.19 |
| 2,025,098 | 12/1935 | Dudick | 192—70.2(X) |
| 2,090,265 | 8/1937 | Padgett | 192—70.2(X) |
| 2,948,557 | 8/1960 | Howe et al. | 192—67(X) |
| 3,233,477 | 2/1966 | O'Brien | 192—70.2(X) |

ALLAN D. HERRMANN, Primary Examiner

U.S. Cl. X.R.

29—401, 525; 192—70.2, 110S; 287—53SS